United States Patent [19]

Moeckel

[11] Patent Number: 4,802,146

[45] Date of Patent: Jan. 31, 1989

[54] METHOD FOR MOVEOUT CORRECTION AND STACKING VELOCITY ESTIMATION OF OFFSET VSP DATA

[75] Inventor: George P. Moeckel, Duncanville, Tex.

[73] Assignee: Mobil Oil Corporation, New York, N.Y.

[21] Appl. No.: 737,352

[22] Filed: May 23, 1985

[51] Int. Cl.$^4$ .......................... G01V 1/00; G01V 1/28
[52] U.S. Cl. .......................................... 367/52; 367/51; 364/421; 364/422
[58] Field of Search ...................... 367/50, 51, 52, 57, 367/59, 63; 364/421, 422

[56] References Cited

U.S. PATENT DOCUMENTS

| | | | |
|---|---|---|---|
| 2,838,743 | 6/1958 | Fredriksson | 367/51 |
| 3,080,545 | 1/1959 | Perry et al. | 367/51 X |
| 3,348,194 | 10/1967 | Witt et al. | 367/51 |
| 3,417,370 | 12/1968 | Brey | 367/40 |
| 3,886,487 | 5/1975 | Walsh et al. | 367/92 |
| 4,203,161 | 5/1980 | Johnson et al. | 364/421 X |
| 4,314,347 | 2/1982 | Stokely | 367/47 X |
| 4,372,239 | 2/1983 | Hagelberg et al. | 367/96 X |
| 4,397,004 | 8/1983 | Bronislaw | 367/43 X |
| 4,527,260 | 7/1985 | Horowicz | 367/34 X |
| 4,596,005 | 6/1986 | Frasier | 367/74 X |
| 4,597,066 | 6/1986 | Frasier | 367/74 X |
| 4,597,464 | 7/1986 | Cheminski | 181/114 |

OTHER PUBLICATIONS

K. Dautenhahn Wyatt; Downhole Vertical Seismic Profile Survey Reveals Structure Near Borehole; pp. 77–82, 1982.

Primary Examiner—Thomas H. Tarcza
Assistant Examiner—Tod R. Swann
Attorney, Agent, or Firm—Alexander J. McKillop; Charles J. Speciale; George W. Hager, Jr.

[57] ABSTRACT

A moveout correction process and stacking velocity estimation process to permit stacking of vertical seismic profile (VSP) data is disclosed wherein the primary reflection time is determined by using the two-way travel time, the root mean square velocity of acoustic pulses in the formation and the first arrival time of direct path acoustic pulses.

3 Claims, 8 Drawing Sheets

GEOMETRY OF AN OFFSET VSP

SIERRA RAY TRACE DATA
FOR A LAYERED MODEL, OFFSET VSP

SOURCE OFFSET: 3000'

METHOD FOR MOVEOUT CORRECTION AND STACKING VELOCITY ESTIMATION OF OFFSET VSP DATA

BACKGROUND OF THE INVENTION

In many cases, Vertical Seismic Profiles (VSP) must be conducted with the source placed at considerable distance from the well. The reasons for this are usually ones of a practical nature; for example, source-induced noise such as casing ring and tube waves can obscure reflection events when the source is close to the well, the configuration of the drilling support equipment on a well pad may necessitate placement of a source at some distance from the well and culture or local land conditions may dictate the source placement. The most frequent demand for long offset VSP data acquisition is the requirement for tube wave suppression. Empirically, it is found that the amplitude of tube waves diminishes with increasing source offset from a well. In addition, the time delay of seismic reflection events resulting from a long offset source is usually less than the delay of tube wave inception. This tends to keep reflection events well separated from tube waves, resulting in much better VSP data quality.

Borehole seismic acquisition programs can be designed to obtain data at multiple long offsets for a number of reasons; the applications include: the provision of offset seismic profiles recorded in a well that are directly correlative to well log data, the acquisition of seismic data free of surface organized noise, the determination of seismic transmission and reflection properties with offset and depth, acquisition of data appropriate for tomography/inversion and imaging, the delineation of reservoir properties when offset VSP profiles are conducted in a field for several wells with 2-D or 3-D applications and determination of depth and interreflector velocities of reflectors below the borehole Total Depth (TD) from lookahead VSP data.

For purposes of this application, the terms "offset VSP", "lateral seismic profile", and "offset seismic profile" in a well are used as equivalent terms, meaning either seismic data acquisition for a multiplicity of receivers in a well recording data from each of a multiplicity of sources on the surface; or the reciprocal situation for which a multiplicity of receivers on the surface record data from each of a multiplicity of source locations in the well.

Offset VSP processing has not been as extensively developed as surface seismic data processing or conventional VSP processing. Conventional VSP data processing assumes that the source offset from the well is essentially zero. One of the greatest concepts of this century for reflection seismology has been Common Depth Point (CDP) stacking. This concept utilizes the near-hyperbolicity of primary seismic reflection arrivals to align redundant reflections obtained from multiple shot/receiver experiments conducted on the earth's surface. Some geophysical contractors approach the problem of aligning reflections from offset VSP data through ray tracing. Surface seismic data may be moveout corrected by ray tracing, but it is far more common to employ a hyperbolic moveout correction formula and develop velocity spectra in the applications.

The asymmetry of the shot and receiver locations in offset VSP precludes the possibility of CDP stacking exactly as in-surface seismic data processing.

SUMMARY OF THE INVENTION

The present invention pertains to vertical seismic profile data amd more particularly to dynamic moveout correction and stacking velocity estimation of data from offset vertical seismic profiles. Concepts similar to Common Depth Point stacking are developed for offset VSP data. Results apply to both VSP data acquired with a single source location at a long offset and offset VSP data with multiple source locations in a line away from a well. Should a downhole source be deployed with receivers on the surface, source/receiver reciprocity will allow application of the results to this type of data. A method preparatory to stacking offset vertical seismic profile data is disclosed wherein a dynamic moveout correction is applied to vertical seismic profile data to align reflection events. The moveout correction process may also be used to obtain stacking velocities for offset vertical seismic profile data. Once the offset vertical seismic profile data has been corrected, it is stacked at its true subsurface locations.

DESCRIPTION OF THE PREFERRED EMBODIMENT

Figure 1:
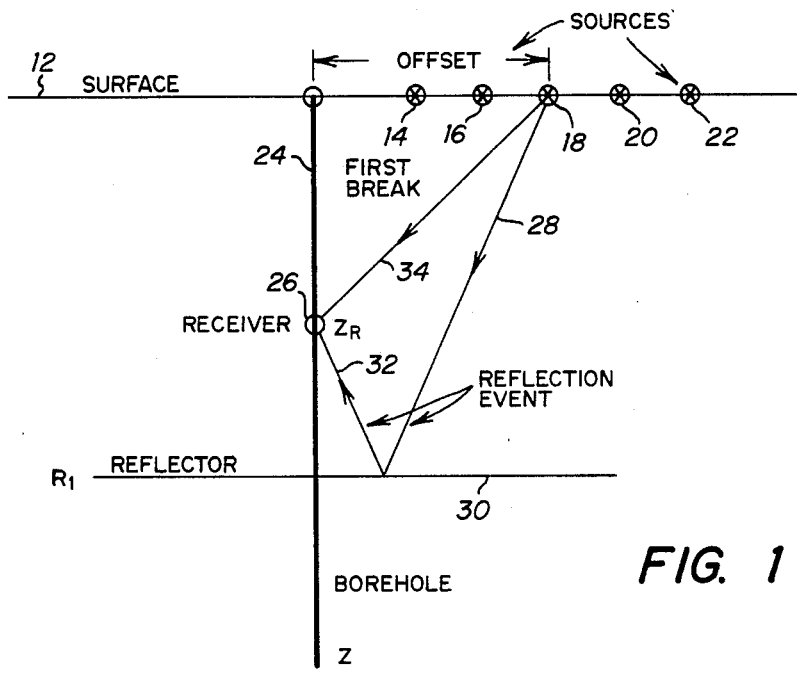
FIG. 1 is a plan view of a system for obtaining vertical seismic profile data.

FIG. 1 is a plan view of a data acquisition source for acquiring vertical seismic profile data. Illustrated along earth's surface 12 are acoustic pulse sources 14, 16, 18, 20 and 22, each having a distance x associated with it. The distance x is the distance measured from a borehole 24 in which an acoustic pulse receiver 26 is suspended. A travel path 28 is illustrated as the path of an acoustic pulse from acoustic source 18 to a reflector 30. Ray path 32 is the path of an acoustic pulse from source 18 that has been reflected off reflector 30 and received by receiver 26. Ray path 34 is the path of an acoustic pulse generated by source 18 and traveling directly to receiver 26, normally called the "first break" path.

The general field setup for an offset VSP is depicted in FIG. 1 with the shots placed on the earth's surface by sources 14, 16, 18, 20 and 22 and receiver 26 downhole.

In the execution of a standard vertical seismic profile, the seismic source and receiver are regarded to be nearly on the same vertical line. Primary seismic reflections obtained from a receiver located at various depths may be aligned or flattened by adding the one-way first break time $T_B(z_R)$ to the seismic record obtained with the receiver at depth $z_R$. Usually, VSP data are preprocessed to remove downgoing waves before reflection alignment is achieved.

When the source and receiver are not on the same vertical line and the VSP is executed with long offsets, a different procedure for aligning primary reflections will be required. According to Appendix I, for flat layers (e=0°), the primary reflection travel time T is given by $$T^2(x, z_R) = \frac{x^2}{v_0^2} + \frac{z_R^2}{v_0^2} + t_\infty^2 - 2t_\infty \frac{z_R}{v_0}, \quad (1)$$

where x is the offset distance of the source from the borehole, $z_R$ is the depth of the receiver in the borehole, and $v_O$ is the constant velocity describing the media. The time $t_\infty$ is $$t_\infty = \frac{2z_0}{v_0}, \quad (2)$$

which is the two-way, normal incidence travel time to a reflector at depth $z_O$ from the surface z=0. At offset x=0, $$T^2(x=0, z_R) = t_\infty^2 - 2t_\infty \frac{z_R}{v_0} + \frac{z_R^2}{v_0^2} = \left(t_\infty - \frac{z_R}{v_0}\right)^2. \quad (3)$$

At offset x=0 and depth $z_R$=0, $$T^2(x=0, z_R=0) = t_\infty^2. \quad (4)$$

It follows that $$T^2(x, z_R) = T_0^2(z_R) + \frac{x^2}{v_0^2}. \quad (5)$$

This last formula is reminiscent of the hyperbolic stacking formula used in NMO corrections for CDP gathered data. Formula (5) cannot be adapted to variable velocity media. In order to indicate why this cannot be done, the following interpretations are assumed. The first break time $T_B(z_R)$ corresponds to $z_R/v_O$, that is, replace $z_R/v_O$ in formula (5) by $T_B(z_R)$.

$$\frac{z_R}{v_0} \sim T_B(z_R) = \int_0^{z_R} \frac{d\zeta}{v(\zeta)}. \quad (6)$$

The first break times $T_B(z_R)$ for normal incidence are already computed from VSP data in a separate algorithm which may be any currently in use in the art. Such an algorithm attempts to correct for the slant path of the direct arrival rays when the source is offset some distance x. If the velocity $v_O$ appearing in formula (5) is interpreted as the stacking velocity, formula (5) may be rewritten as $$t_\infty = T_B(z_R) + \sqrt{T^2(x, z_R) - \frac{x^2}{v_{\text{stack}}^2(t_\infty)}}. \quad (7)$$

This last formula is the type of moveout correction we seek for offset VSP data because it allows the determination of velocity spectra ($t_\infty$ and $v(t_\infty)$) stack which best flatten reflection data. Since formula (7) is based on formula (5), it cannot be used for VSP moveout correction. For a VSP conducted at a single long offset, redundancy of reflection events must come from variation in depth $z_R$ and not offset x. Thus, to use an offset VSP moveout correction like formula (7), we can consider the offset x as fixed and vary the receiver depth $z_R$. The desire is to modify a standard coherency stack for VIP process to suit our needs. Time windows $T_B(z_{R1}) < t_\infty/2 < T_B(z_{R2})$ such that $z_{R1} < z_{R2}$ can be selected and optimal parameters $t_\infty$, $v(t_\infty)$ stack determined for moveout correction in that time window. For laterally homogeneous media, where velocity varies with depth only, $v(t_\infty)$ stack' appearing in formula (7), is difficult to interpret because of the asymmetry of ray paths. Unless the receiver is on the surface, a downgoing ray path encounters a different set of velocities than the upgoing ray path. An offset VSP moveout formula is disclosed by the present invention in which the velocities are completely interpretable. This formula applies to laterally homogeneous media.

Formula (1) may be interpreted in several different ways. If one assumes that $$\frac{x^2 + z_R^2}{v_0^2} \sim T_B^2(x, z_R), \quad (8)$$

then the first break time at offset x and the depth $z_R$ is obtained directly from the VSP.

The remaining coefficient, $z_R/v_O$ in formula (1), is interpreted exactly as in equation (6). With these estimates, formula (1) becomes $$T^2(x, z_R) = T_B^2(x, z_R) + t_\infty^2 - 2t_\infty T_B(z_R). \quad (9)$$

If one solves for $t_\infty$, the following moveout formula is obtained:

$$t_\infty = T_B(z_R) + \sqrt{T_B^2(z_R) + T^2(x, z_R) - T_B^2(x, z_R)}. \quad (10)$$

This gives $t_\infty$ directly and no spectra are available. If x=0 (zero offset), $$T_B(x, z_R)\bigg|_{x=0} = T_B(z_R) \text{ so that } t_\infty = T_B(z_R) + T(0, z_R).$$

This last result shows that for zero offset, formula (10) reduces to the conventional method of aligning reflection events from VSP traces obtained for multiple depths $z_R$.

Another estimate is possible; we can approve of assumption (8) but not (6), then with a variable velocity $v_s(t_\infty)$, we obtain from formula (1)

$$T^2(x,z_R) = T_B(x,z_R) + t_\infty^2 - 2t_\infty \frac{z_R}{v_s(t_\infty)}. \tag{11}$$

When this equation is solved for the two-way travel time $t_\infty$, the result is:

$$t_\infty = \frac{z_R}{v_s(t_\infty)} + \sqrt{\frac{z_R^2}{v_s^2(t_\infty)} + T^2(x,z_R) - T_B^2(x,z_R)}. \tag{12}$$

The form of equation (12) is amenable to the computation of velocity spectra, but the interpretation of the velocity $v_s$ is difficult. At zero offset (x=0), $$T_B(x,z_R)|_{x=0} = T_B(z_R)$$

and we must have $$\frac{z_R}{v_s(t)} = T_B(z_R).$$

This implies that at zero offset, $v_s$ has the interpretation $$v_s^{-1}(t) = \frac{1}{z_R} T_B(z_R) = \frac{1}{z_R} \int_0^{z_R} \frac{d\zeta}{v(\zeta)} = \overline{v^{-1}[z_R(t)]}. \tag{13}$$

This means that $v_s^{-1}$ appearing in formula (12) takes the value of the average slowness at zero offset.

Figure 2:
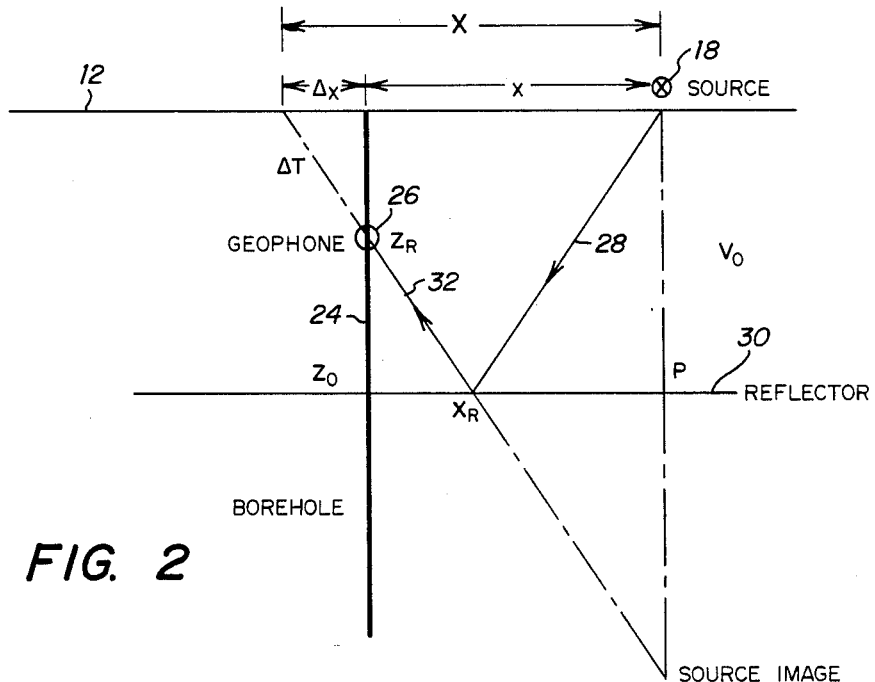
FIG. 2 is a more detailed drawing of FIG. 1.

Referring now to FIG. 2, a more detailed illustration of FIG. 1 is presented. If the point at which an acoustic pulse traveling down path 28 meets with reflector 30 is labeled as $X_R$, the point on reflector 30 which is the shortest distance from source 18 is labeled as P. The point on reflector 30 which intersects borehole 24 is labeled as $z_O$. The point at which receiver 26 is located in borehole 24 is labeled as $z_R$. A continuation of travel path 32 to surface 12 is indicated in travel time of $\Delta T$. The space from borehole 24 along surface 12 which a continuation of ray path 32 would intersect surface 12 is labeled as $\Delta x$. The distance from the intersection of a continuation of ray path 32 and surface 12 to source 18 is labeled as X.

The offset VSP stacking velocities introduced in formulae (7) and (11) are difficult to interpret. For surface seismic data, in layered media, the stacking velocity for a CDP gather, to a second-order approximation in offset, is the RMS velocity. In FIG. 2, the VSP ray path in media with constant velocity $v_0$ is shown to be extended to surface 12. Since triangles $xx_Rp$ and $z_Rz_Ox_R$ are similar triangles, the ratio $$\frac{x - x_R}{z_0} = \frac{x_R}{z_0 - z_R} \tag{14}$$

is valid. Equation (14) may be solved for $x_R$, the reflection point, in terms of the source 18 offset x, reflector 30 has a depth $z_O$, and the receiver depth $z_R$; this results in the expression $$x_R = \frac{(1-h)x}{(2-h)}, \text{ where } h = \frac{z_R}{z_0}. \tag{15}$$

in FIG. 2, $x_R$ is the reflection point and $\Delta T$ is the incremental time for the VSP ray, received at $z_R$, to arrive at the surface a distance $\Delta x$ from the well. From FIG. 2, it is also apparent that $$\frac{z_R}{\Delta x} = \frac{z_0 - z_R}{x_R}, \text{ so that} \tag{16}$$

$$\Delta x = \frac{z_R}{z_0 - z_R} \cdot x_R = \frac{h}{1-h} \cdot x_R.$$

Substitution of equation (15) into equation (16) provides the result $$\Delta x = \frac{h}{2-h} \cdot x. \tag{17}$$

According to FIG. 2, the distance between the point where extended VSP ray 32 meets surface 12 and source 18 is X and $X = x + \Delta x$. An application of equation (17) to this last result allows the relationship.

$$X = \frac{2x}{2-h}. \tag{18}$$

Let the reflection time for the surface-to-surface ray path be $T_{ss}$, then $$T_{ss}^2 = \frac{4z_0^2}{v_0^2} + \frac{X^2}{v_0^2} = t_\infty^2 + \frac{X^2}{v_0^2}, \text{ or}$$

$$T_{ss} = \sqrt{t_\infty^2 + \frac{X^2}{v_0^2}}.$$

Moreover, for layered media to a second-order approximation in offset distance $X_2$ $$T_{ss} \approx \sqrt{t_\infty^2 + \frac{X^2}{v_{RMS}^2(t_\infty)}}, \tag{19}$$

where $v_{RMS}(t_\infty)$ is the root mean square (RMS) velocity. We now estimate the quantity h appearing in equation (18) as follows $$h \equiv \frac{z_R}{z_0} = \frac{\frac{z_R}{v_0}}{\frac{z_0}{v_0}} \approx \frac{T_B(z_R)}{\frac{1}{2}t_\infty},$$

whence follows from equation (18)

$$X = \frac{t_\infty x}{t_\infty - T_B}. \tag{20}$$

Substitution of equation (20) into equation (19) leads to the result $$T_{ss} = t_\infty \sqrt{1 + \frac{x^2}{(t_\infty - T_B)^2 \, v_{RMS}^2(t_\infty)}} \quad (21)$$

The offset VSP travel time T is obtained from the surface-to-surface travel time $T_{ss}$ by subtracting the incremental travel time $\Delta T$ from $T_{ss}$; that is $$T = T_{ss} - \Delta T,$$

where $\Delta T$ is the one-way travel time from the point $(O,x_R)$ to the surface point $(\Delta x, O)$. The time $\Delta T$ can be expressed through a hyperbolic formula which maintains the same order of approximation as is used in formula (19). This formula is:

$$(\Delta T)^2 \cong T_B^2(z_R) + \frac{\zeta^2}{v_{RMS}^2(T_B)}. \quad (22)$$

We notice that if $\zeta = x$, then $$\Delta T|_{\zeta = x} = T_B(x, z_R),$$

which are recorded data, namely the first break times at offset $\zeta = x$. The times $T_B(x, z_R)$ may be difficult to obtain at long offsets because head refractions may precede these events. In the case $T_B(x, z_R)$ is observed, the zero offset first break time $T_B$ may be estimated by $$T_B^2(z_R) = T_B^2(x, z_R) - \frac{x^2}{v_{RMS}^2(T_B)} \quad (23)$$

and $$[\Delta T(\Delta x)]^2 \cong T_B^2 + \frac{(\Delta x)^2}{v_{RMS}^2(T_B)} \cong T_B^2 + \quad (24)$$

$$\frac{4 T_B^2 / t_\infty^2}{(2 - 2 T_B/t_\infty)^2} \cdot \frac{x^2}{v_{RMS}^2(T_B)} =$$

$$T_B^2 + \frac{T_B^2}{(t_\infty - T_B)^2} \cdot \frac{x^2}{v_{RMS}^2(T_B)},$$

where equation (17) and the same estimates used in formula (21) have been introduced into formula (22) with $\zeta = \Delta x$. It follows that $$[\Delta T(\Delta x)]^2 = T_B \sqrt{1 + \frac{x^2}{(t_\infty - T_B)^2 \, v_{RMS}^2(T_B)}}. \quad (25)$$

It remains to substitute the results of formulae (21) and (25) into the equation, $T = T_{ss} - \Delta T$, to obtain the offset VSP moveout correction formula $$T_{(x,z_R)} = t_\infty \sqrt{1 + \frac{x^2}{(t_\infty - T_B)^2 \, v_{RMS}^2(t_B)}} - \quad (26)$$

$$T_B \sqrt{1 + \frac{x^2}{(t_\infty - T_B)^2 \, v_{RMS}^2(T_B)}}.$$

This formula can be used to obtain velocity spectra in a way that allows the stacking velocities to be interpretable. The velocities appearing in formula (26) are the familiar RMS velocities that are estimated by means of stacking velocities in surface seismic data processing. The symmetry in offset VSP source-receiver placement is manifest in the requirement that $v_{RMS}(t_\infty)$ and $v_{RMS}(T_B)$ must both appear in the offset VSP moveout correction formula. In formula (26), $t_\infty > T_B$ and for the special case that there is a reflector at depth $z_R$, the equality $t_\infty(z_R) = 2T_B(z_R)$ holds. Once optimal values of $v_{RMS}(t_\infty)$ have been determined, the traces at depths $z_R$ are moveout corrected dynamically by $$(\Delta T)_{moveout} = t_\infty - T. \quad (27)$$

For the source at zero offset $x = 0$, formula (26) reduces to the standard VSP time shift for aligning primary reflections $$T_{(O,z_R)} = t_\infty - T_B(z_R). \quad (28)$$

In the special case that the receiver is on the surface, $z_R = 0$, we have $T_B(z_R = 0) = 0$, and formula (26) takes the form $$T_{(x,0)} = \sqrt{t_\infty^2 + \frac{x^2}{v_{RMS}^2(t_\infty)}}, \quad (29)$$

which resembles the standard hyperbolic moveout correction formula for surface seismic data. For a constant velocity medium, $v_{RMS}(t_\infty) = v_O$ for all values of $t_\infty$, where $v_O$ is a constant velocity, and formula (26) takes the special form $$T_{(x,z_R)} = \sqrt{(t_\infty - T_B)^2 + \frac{x^2}{v_0^2}}, \text{ so that} \quad (30)$$

$$t_\infty = T_B(z_R) + \sqrt{T^2(x, z_R) - \frac{x^2}{v_0^2}}.$$

This shows that formula (30) is exactly formula (7) for a constant velocity.

Figure 3:
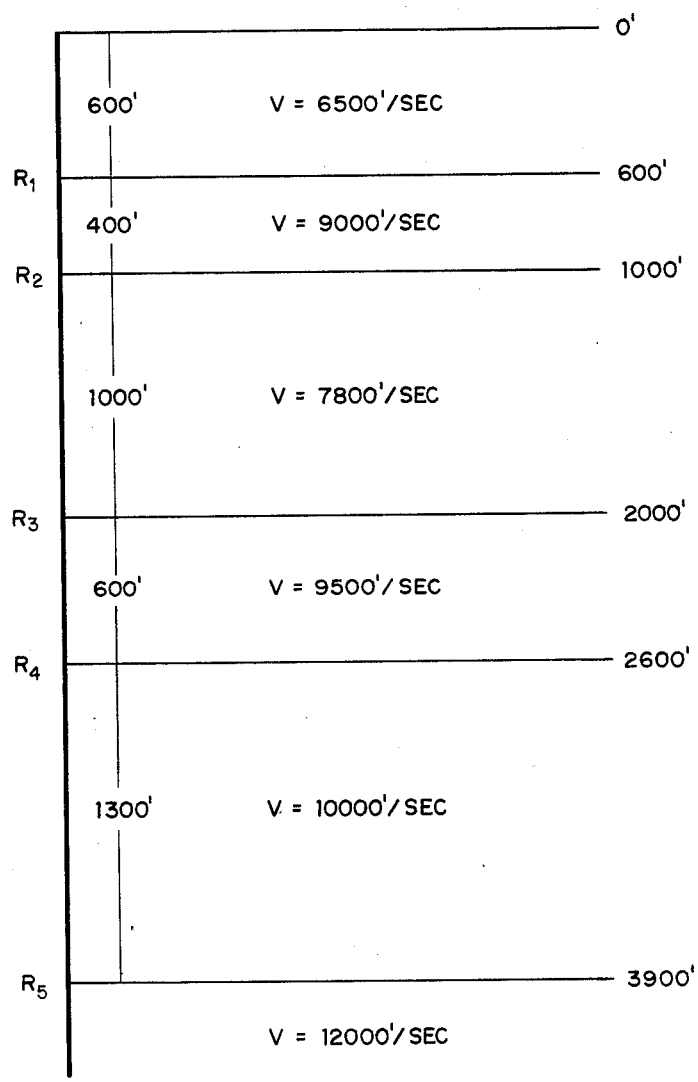
FIG. 3 is a layered model for a synthetic offset vertical seismic profile.

In order to examine the accuracy of the offset VSP moveout correction formula (26), consider FIG. 3 which depicts a model of five flat reflectors separating layers with the indicated interval velocities. The Sierra, VSP ray trace program was used to generate offset VSP data based on this model. Geophones were located in the borehole from depths of 50 feet to 3750 feet in increments of 50 feet and a source was placed on the surface from 100 feet offset to the well to 5000 feet offset to the well in increments of 100 feet. Tables 1 and 2 of Appendix 2 compare the ray trace times $T(x, z_R)$ delivered by Sierra with those computed with formula (26) for reflectors $R_5$ and $R_3$, shown in FIG. 3, for the indicated source offsets x and geophone depths $z_R$. Inspection of these tables indicates sufficient accuracy of the offset VSP moveout correction formula (26) for use toward the required dynamic corrections for offset VSP data traces. Table 3 of Appendix 2 is a compilation of $z_R$, $T_B(z_R)$ and $v_{RMS}[T_B(z_R)]$ together with the two-way, normal incidence travel times for the reflectors $R_1$ through $R_5$ and RMS velocity at these reflector horizons for the model depicted in FIG. 3. Besides the offset x, Table 3 contains the required information to compute the offset VSP travel times listed in Tables 1 and 2 using formula (26). The computation of the RMS velocities $v_{RMS}(t)$ was based on the internal velocities and depths depicted in FIG. 3 with an applicaion of the standard definition $$v_{RMS}^2(t) = \frac{1}{t} \int_0^t v^2(t)dt. \quad (31)$$

In equation (31), $v(t)$ is the interval velocity and $t$ may be either one-way or two-way normal incidence travel time.

Figure 4:
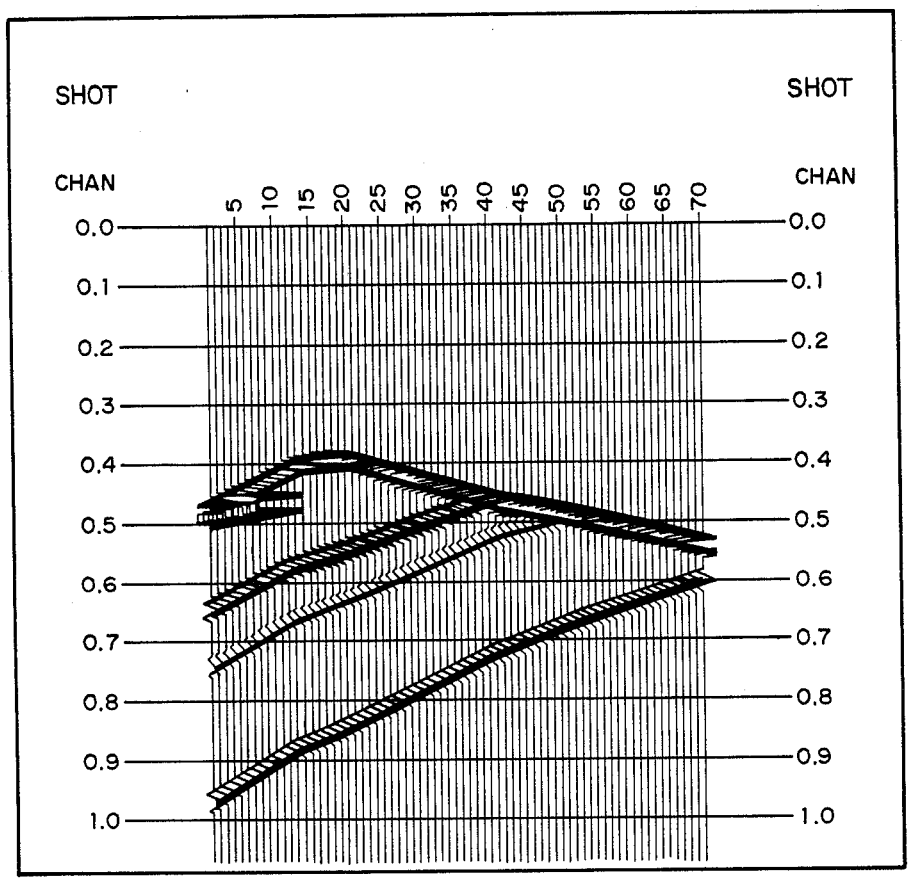
FIG. 4 is a ray trace for a layered model offset vertical seismic profile.

FIG. 4 shows the results of ray tracing with the Sierra offset VSP algorithm applied to the five reflector model of FIG. 3 with the source offset 3,000 feet. Except for the first break events on each trace, the only other events in the seismogram are upcoming arrivals of the primary reflections from the five interfaces in the model. It is usual practice to mute the first breaks on all traces in processing VSP reflection data and appropriate mutes were applied to the data in FIG. 4 as a conventional preprocessing step. In order to demonstrate the application of formula (26), the reflections from reflector $R_1$ and $R_2$ were removed from the seismogram in FIG. 4 because they were very shallow and the critical offset for reflector $R_1$ is only about 626 feet. The remaining three reflectors were processed by the conventional VSP processing in which a static time shift equal to $T_B(z_R)$ is applied to each trace.

Figure 5:
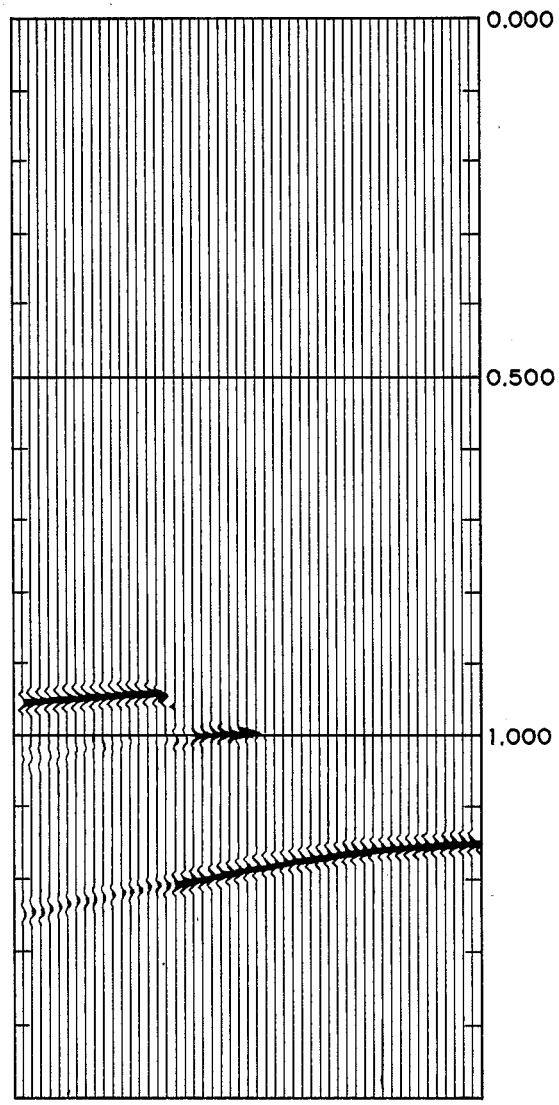
FIG. 5 is a ray trace illustrating prior art processing methods.

FIG. 5 shows the result of applying conventional VSP processing to these data and that a residual correction must be applied to these data to bring reflection events into alignment.

Figure 6:
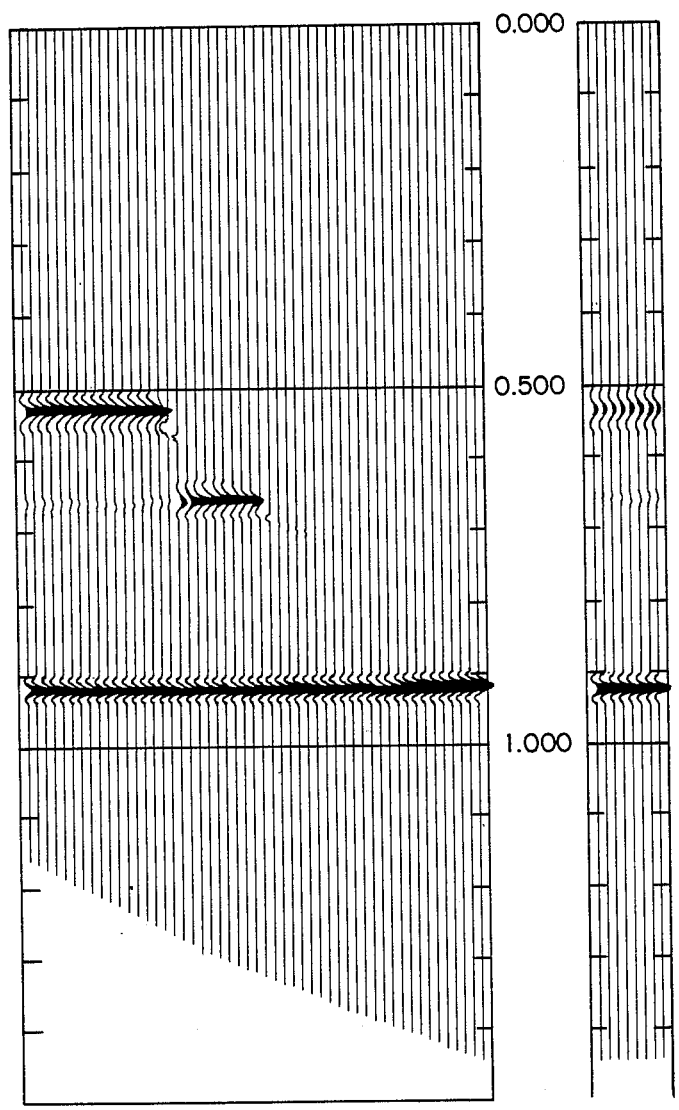
FIG. 6 is a ray trace illustrating offset vertical seismic profile moveout correction applied to model data.

In FIG. 6, the same data have been dynamically corrected using the offset VSP moveout correction formula (26). In the course of moveout correcting these data, the actual values of $v_{RMS}(t_\infty)$ and $v_{RMS}(T_B)$ were supplied in formula (26), as listed in Table 3. Inspection of FIG. 6 shows adequate reflection alignment for stacking. The corresponding stacking traces are also shown in FIG. 6. The demonstration of FIG. 6 serves as an indication that dynamic offset VSP moveout correction as prescribed in formula (26) can be successfully applied to offset VSP data traces to align primary reflection events without recourse to ray tracing.

There are several methods of implementing formula (26) to accomplish offset VSP moveout corrections. These methods differ in the selection of velocities and offset VSP traces used in velocity estimation. In implementing formula (26), all times appearing on the right-hand side of formula (26) are converted to two-way times. The two-way first break times $t_B$ are defined by $$t_B(z_{Rk}) \equiv 2T_B(z_{Rk}), \; k=1,2,\ldots, k \text{ and} \quad (32)$$

$$V_{RMS}(t_B) \equiv v_{RMS}(T_B),$$

then the set of $T_B$'s falls naturally into the list of all normal incidence, two-way travel times $t_\infty$. In general, $0 < t_\infty < t_\infty(max)$ with $t_\infty(max)$ defined as the maximum expected normal incidence, two-way time in a seismic section, and it will be true that $t_B < t_\infty(max)$. Reflectors are aligned below the deepest geophone in the well using this analysis. The definition (32) ensures that a single list of times can be constructed for all applications.

The offset VSP data traces are defined to be $D(x,z_R,t)$ and a seismic trace exists at each offset x and depth of geophone $z_R$. This trace is to be transformed into a trace $D_{MO}(x,z_R,t_\infty)$, which will be moveout corrected via formula (27). The time transformation of formula (26) can be represented as a function $H[\;]$ given by $$T = H[x, z_{Rk}, v_{RMS}(t_\infty), t_\infty].$$

The VSP data trace will be sampled in time at a rate $\Delta t$, which will be 1, 2, or 4 milliseconds or some other specified increment. The moveout corrected trace $D_{MO}$ is to be sampled at the same rate as the input trace. If $$t_{28}(i) = i\Delta t, \; i = 0, 1, \ldots, I,$$

then for some value $t_\infty(i)$ $$T_i = H[x, z_{Rk}, v_{RMS}(t_\infty(i)), t_\infty(i)].$$

The value $T_i$ will, in general, not fall on the times $t_j = j\Delta t$, $j=1,2,\ldots,J$, appearing in the data trace $D(x, z_{Rk}, t_j)$ and a linear interpolation will be required. Suppose that $T_i$ is in the interval $t_j < T_i < t_{j+1}$, then the moveout corrected trace can be represented by simple linear interpolation as:

$$D_{M0}(X, z_{Rk}), t_\infty(i)) = \frac{(t_{j+1} - T_i)}{\Delta t} D(\cdot, \cdot, t_j) + \frac{(T_i - t_j)}{\Delta t} \cdot D(\cdot, \cdot, t_{j+1})$$

In the course of computing the moveout correction times, it is necessary to obtain $V_{RMS}(t_B(z_{Rk}))$, as well as $v_{RMS}(t_\infty)$.

Another version of the offset VSP moveout correction is possible. This estimate does not require that the seismic wave, received in the borehole, be extrapolated to the surface. The derivation of the alternate formula will contain the same order of approximations as in equation (19). With reference to FIG. 2, the VSP moveout time estimate is $$T = \sqrt{T_0^2 + \frac{(x - x_R)^2}{v_{RMS}^2(T_0)}} + \sqrt{T_{0G}^2 + \frac{x_R^2}{v_{RMS}^2(T_{0G})}}, \quad (33)$$

where $$T_{0G} = \int_{z_G}^{z_0} \frac{dz}{V(z)}, \; T_0 = \int_0^{z_0} \frac{dz}{V(z)}$$

and $T_B = T_O - T_{OG}$. The times $T_B$, $T_{OG}$ and $T_O$ are all normal incidence one-way times. The reflection distance $x_R$ can be replaced by $$x_R = \frac{(T_0 - T_B)}{t_\infty - T_B} x, \quad (34)$$

because of equation (15), the identity $t_\infty = 2T_O$ and the travel-time estimate $h = 2T_B/t_\infty$. A simple calculation also shows that $$x - x_R = \frac{x}{2 - h},$$

and with the same estimate for h as used above, we conclude that $$x - x_R = \frac{T_0 x}{t_\infty - T_B}. \tag{35}$$

The quantity $V_{RMS}(T_{OG})$ can be resolved by the well-known rules for decomposition of root mean square velocity $V_{RMS}$, that is $$V_{RMS}^2(T_{0G}) = \frac{T_0 V_{RMS}^2(T_0) - T_B V_{RMS}^2(T_B)}{T_0 - T_B}. \tag{36}$$

Replacement of equations (34), (35) and (36) into equation (33) leads to the alternative VSP moveout correction formula $$T = T_0 \sqrt{1 + \frac{x^2}{(t_\infty - T_B)^2 V_{RMS}^2(T_0)}} + (T_0 - T_B) \sqrt{1 + \frac{(T_0 - T_B)x^2}{(t_\infty - T_B)^2 [T_0 V_{RMS}^2(T_0) - T_B V_{RMS}^2(T_B)]}}. \tag{37}$$

The application of formula (37) is similar to formula (26). The VSP moveout prediction given by formula (26) is slightly better than the corresponding prediction given by formula (37) when the geophone is relatively near the reflector, while formula (37) performs slightly better than formula (26) when the geophone is relatively far from the reflector. More often than not, when the geophone is in a shallow position in the well, reflection data of marginal quality are recorded in VSP's for deep reflector locations, and better reflection data are recorded when the geophone is near the reflector. For these reasons, formula (26) is preferred to formula (37) in most applications.

Several methods of introducing velocities into formula (26) will now be discussed, together with appropriate means of trace selection to complete the velocity analysis.

METHOD I

The most simple method of introducing velocities into formula (26) is to use the RMS velocities derived from the analysis of the first break times $T_B(z_{Rk})$, $k = 1, 2, \ldots, K$. RMS velocities $v_{RMS}(t_\infty)$ for the range $0 < t_\infty < t_B(z_{Rk})$, where $z_{Rk}$ is the deepest geophone location in a well for which a first break time has been obtained are provided. There will generally be reflection events at times greater than this value of t and the required values of $v_{RMS}(t_\infty)$ may be generated by either interpolating the function $v_{RMS}(t_\infty)$ for $t_\infty < t_B$, or by introducing velocities from an external source such as analysis of CDP surface seismic data in the vicinity of the well. If offset VSP moveout corrections are performed with a fixed RMS velocity function, there is a good probability that reflection alignment will not be optimal. For a VSP conducted with a source at a single long offset, imperfect reflection alignment can be troublesome. For an offset VSP with multiple sources, poor reflection alignment is unacceptable because such data will be gathered with the intention of extending reflection horizons away from the well. This leads to the requirement of developing a data adaptive method of obtaining velocities $v_S(t_\infty)$ to replace the RMS velocities appearing in formula (26) in order to align reflectors in an optimal manner.

METHOD II

An offset VSP, constant velocity (CV) stack is defined as follows:

A partition of the interval $[0, t_\infty(\max)]$ is selected with J intervals $$[t_\infty(j-1), t_\infty(j)], j = 1, 2, \ldots, J \text{ with } t_\infty(0) = 0.$$

the velocity $v_S(t_\infty)$ will be a linear function on each interval $[t_\infty(j-1), t_\infty(j)]$ and the partition itself may be dictated by knowledge of the function $v_{RMS}(t_\infty)$ obtained from first break times or external data. The velocities $v_S(t_\infty(j))$ at the nodes are going to be determined in a data adaptive process. The velocity $v_S(0)$ can be prescribed by knowledge of near surface conditions. We assume that $v_S(t)$ is a continuous function.

At fixed offset x, define a suite of sweep velocities $v_S(1,n)$ $n = 1, 2, \ldots, N$ in a neighborhood of $v_{RMS}(t\infty(1))$ and perform the required evaluation of $v_S(t_B)$ for $0 < t_B < t_\infty(1)$. For each $v_S(1,n)$, VSP moveout correct the traces and display them, one display for each $v_S(1,n)$; this will require only several traces at geophone depths near the shallowest portion of the survey. Mute all traces below $t_\infty(1)$. Qualitatively choose the "best fit" $v_S*(1)$ from the suite of velocities $v_S(1,n)$. Continue the process by prescribing a suite of sweep velocities $v_S(2,n)$ $n = 1, 2, \ldots, N$ in a neighborhood of $v_{RMS}(t\infty(2))$ and evaluate $v_S(t_B)$ for $t_\infty(1) < t_B < t_\infty(2)$ using the velocity $v_S*(1)$. Perform VSP moveout corrections with each of the velocities $v_S(2,n)$ for $0 < t_\infty < t_\infty(2)$ and qualitatively choose the best fit $v_S*(2)$ from the sweep velocities $v_S(2,n)$. Mute all traces below $t_\infty(2)$ during this step of the process. Continue this procedure for every interval $[t_\infty(j-1), t_\infty(j)]$, proceeding with increasing j, one step at a time. At time $t_\infty(j)$, VSP moveout correction will be applied for all traces between $0 < t_B t_\infty(j)$ and the alignment of shallower reflections will be unaltered because velocities $v_S*(q)$, $q = 1, 2, \ldots, j-1$ remain fixed. When the process is finished, optimal velocities $v_S*(j)$, $J = 1, 2, \ldots, J$ will be determined with which VSP moveout corrections can be performed. For times $t_\infty < t_B(z_{Rk})$, where $z_{Rk}$ is the deepest geophone in the well, $v_S(t_\infty)$ will not be constrained by proximity to $v_{RMS}(t_\infty)$.

METHOD III

For an offset VSP consisting of multiple sources in a line away from a well, the offset VSP CV stack described in Method II above can be applied to data traces for each fixed source offset x. If the depth sampling $z_{Rk}$ is coarse and/or there is particular difficulty with establishing lateral continuity of reflector horizons away from the well, Method II may be applied by displaying CV moveout corrected VSP traces in a window of offsets together with a notation indicating the depth of geophones employed. This will allow visual alignment of reflectors from several offsets at once. The window of offsets can be moved maintaining some degree of overlap. It is tempting to moveout correct offset VSP data by fixing the geophone depth and aligning reflectors for all offsets. This must be done for each depth of the geophone and it is questionable whether a suite of VSP movement corrected profiles could then be stacked over all depths. In other words, it is not sufficient that reflectors align for each offset from a particular geophone depth; they must also align for fixed offset and varying geophone depth.

METHOD IV

The main features of Method II are retained, but, in each interval $[t_\infty(j-1), t_\infty(j)]$, a semblance or coherency measure is employed similar to VIP processing. Instead of a suite of displays of moveout corrected traces for each of a set of sweep velocities, a graph of semblance as a function of $t_\infty$ is output. This method has the disadvantage of being very time-consuming, just as with VIP processing, however, it does attempt to automate stacking velocity analysis.

METHOD V

The features of Method II are retained; however, stacking velocity analysis is to be performed in the common reflection point bins, as described hereinafter below. For an offset VSP, the multiplicity of shots should provide the requisite redundancy of reflections on data traces for each bin. The inequalities (46) provide the time windows in each bin for determining optimal reflection alignment through offset VSP CV stacks.

A METHOD FOR STACKING OFFSET VSP DATA IN COMMON REFLECTION POINT BINS

In equation (15), the relationship among the variables reflection point $x_R$, geophone depth $z_R$, reflector depth $z_O$, and source offset from the well x is expressed for flat layers. It is clear from this formula that for a fixed reflector depth and source offset, the subsurface reflection point $x_R$ varies significantly as the geophone depth is varied. In order to illustrate this variability, consider FIG. 7 which is intended to summarize equation (15). A source is placed 2,000' from the well and the geophone depth is varied in the range indicated on the vertical axis. Curves of constant reflector depth are displayed in FIG. 7. The coordinate of the reflection point $x_R$ is the offset distance indicated vertically below the intersection of geophone depth with the reflector curve. Equation (15) refers to a constant velocity medium. In the development of processing for offset VSP data, the variability of subsurface reflection points must be considered as offset VSP traces are combined in procedures such as stacking. For surface seismic data, the concept of a CDP gather more or less assures that, for a fixed CDP gather, reflections are approximately issuing from the same subsurface location.

Figure 7:
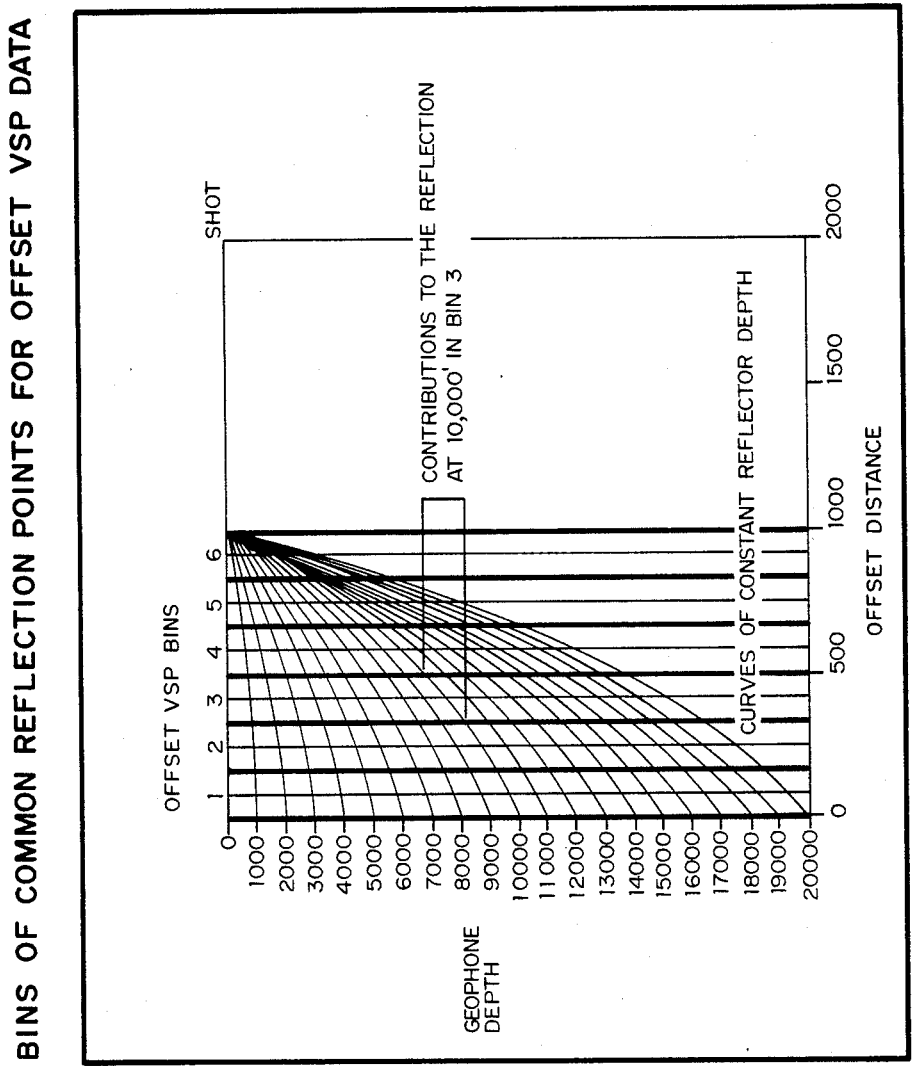
FIG. 7 illustrates bins of common reflection points for offset vertical seismic profile data.

Reflections issuing from approximately the same subsurface location is a concept similar to CDP gather and is demonstrated by the present invention. In FIG. 7, the interval between the well (at offset 0') and the midpoint between the well and the source (at offset 1,000') is partitioned into six equal intervals called bins.

As illustrated in FIG. 7, for the reflector at 10,000 feet of depth, subsurface reflection points will be contained in bin 3, provided we restrict the geophone depths between approximately 6,800 and 8,100 feet of depth. This simple illustration serves to define the concept of binning. In practical applications, the velocity will be variable and the reflector depths will be measured in two-way travel times. In order to accommodate this situation, bins of common reflection points are formed based on the travel time information. The goal of this section will be to stack offset moveout corrected VSP data in bins of common subsurface reflection locations.

An important consideration in all that follows is: the stacking analysis applies to VSP movement corrected data. An application of formula (15) with the same estimates stated after equation (19) leads to the formula $$x_R = \left[ \frac{1 - \frac{2T_B(z_R)}{t_\infty}}{2 - \frac{2T_B(z_R)}{t_\infty}} \right] \cdot x_S, \tag{38}$$

where $x_R$ is the subsurface reflection point and $x_S$ is the offset distance of the shot point from the borehole.

In formula (38), $$\lambda \equiv x_R/x_S$$

and clearly $$0 < \lambda < \tfrac{1}{2}.$$

Formula (38) now provides the relationship $$t_\infty = 2T_B(z_R) \cdot F(\lambda) = t_B(z_R) \cdot F(\lambda), \tag{39}$$

where definition (32) has been used and $$F(\lambda) = \frac{1 - \lambda}{1 - 2\lambda}. \tag{40}$$

VSP data has been obtained in a well at $z_{Rk}$, $k = 1, 2, \ldots, K$ with the source at a long offset $x_S$, with normal incidence first break times $T_B(z_{Rk})$. In the interval $[0, \tfrac{1}{2}]$, bins are formed as follows:

$$\left[ \frac{n}{2N}, \frac{n+1}{2N} \right], n = 0, 1, \ldots, N - 1. \tag{41}$$

It is required to chose the number of bins N. If the bins are too coarse, reflections will be stacked over a wide portion of a reflector and will be smeared, whereas, if the bins are too fine, stacking will be nearly at a subsurface point but the time window contributing to the stack may be too small to be useful. Once the number of bins are chosen, the resulting traces are to be stacked and placed at the centers of the bins, namely $$x_R(n) = \left( \frac{n}{2N} + \frac{1}{4N} \right) x_S = \frac{2n+1}{4N} \cdot x_S, n = 0, 1, \ldots, N - 1. \tag{42}$$

In formula (40), $\lambda$ has the value $n/2N$ so that $$F(\lambda) = \frac{1 - \frac{n}{2N}}{1 - \frac{n}{n}}.$$

For each VSP trace $z_{Rk}$, we compute the times $$t_\infty(n,k) = t_B(z_{Rk}) \cdot \frac{\left(1 - \frac{n}{2N}\right)}{\left(1 - \frac{n}{N}\right)}; \begin{array}{l} k = 1, 2, \ldots, K \\ n = 0, 1, \ldots, N \end{array} \quad (43)$$

In order to bin and stack the VSP traces, proceed as follows:

For the trace to be placed at $1/4N \cdot x_S$, mute all traces $k=1, 2, \ldots, K$ except for the intervals $t(0,k) < t_\infty < t_\infty(1,k)$. These are the "live" portions of the traces and they are subsequently summed over all k. This constitutes the common reflection point stacked trace at $$\frac{1}{4N} \cdot x_S.$$

For the trace to be placed at $$\frac{2n+1}{4N} \cdot x_S,$$

mute all traces $k=1, 2, \ldots, K$ except for the intervals $$t_\infty(n,k) < t_\infty < t_\infty(n+1,k), n=1, 2, \ldots, N-1. \quad (44)$$

These are the "live" portions of the traces and they are subsequently summed over all k. This constitutes the common reflection point stacked trace at $$\frac{2n+1}{4N} \cdot x_S.$$

The quantity $\lambda$ is strictly defined on $[0,\frac{1}{2}]$ and with $\lambda = n/2N$, we will be outside the interval of definition when $n=N$. In equation (43), the value $n=N$ also leads to a computational difficulty. We surmount this difficulty by observing $t_\infty(N,K) = \infty$ in equation (43) and define $t_\infty(N,k) = t_\infty(max)$, where $t_\infty(max)$ is the maximum two-way, normal incidence travel time required for the VSP. The VSP data, $D(x_S, z_R, t)$, will always be gathered for $0 < t < T_{max}$, where $T_{max}$ is maximum listenting time.

When the above-defined segments of traces are summed, there will be overlap resulting in fold. Prior to summing, fold on each segment of a trace must be determined and appropriate weights must be applied to the segments of the unstacked data so that all portions of a stacked trace will be balanced. If the fold on a particular segment of a trace is M, then the natural weight to choose for balancing the stacked traced will be 1/M on each portion of a trace contributing to that segment.

Figure 8:
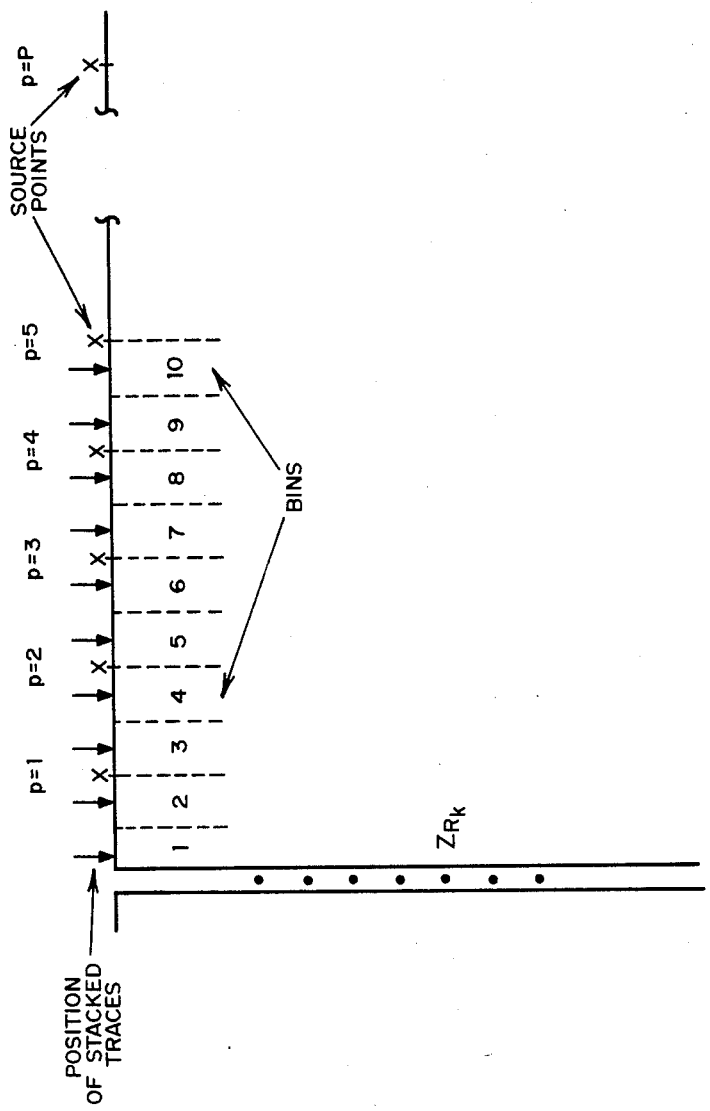
FIG. 8 is an illustration of binning offset vertical seismic profile data with multiple source locations.

If there are many shot points in a line away from the well at offsets $x_S$, we can still use the concepts leading to the relationship (44) in a slightly different context. Let there be P shot points on the surface in a line away from the well, regularly spaced so that $$x_S(p) = p\Delta x_S, p=1, 2, \ldots, P$$

where $\Delta x_S$ is some intrinsic spacing of the shot points. In the actual conduct of an offset VSP survey, the shot spacing $\Delta x_S$ must be chosen small enough that the data are not spatially aliased. In this analysis, we assume that a proper choice for the shot spacing has been made. For each shot p, $p=1, 2, \ldots, P$, we chose bins as follows $$p = 1 \quad \text{the bin is} \left[0, \frac{1}{2}\right]\Delta x_S$$

$$p = 2, \quad \text{the bins are} \left[0, \frac{1}{2}\right]\Delta x_S \text{ and } \left[\frac{1}{2}, 1\right]\Delta x_S$$

$$\vdots$$

$$p = q, \quad \text{the bins are} \left[\frac{n}{2}, \frac{n+1}{2}\right]\Delta x_S; \begin{array}{l} n = 0, 1, \ldots, q-1 \\ q = 1, 2, \ldots P \end{array}$$

as depicted in FIG. 8. Now recall the definition $$\lambda = \frac{x_R}{x_S} = \frac{x_R}{p\Delta x_S}, p = 1, 2, \ldots, P.$$

We desire to construct a partition of $[0,\frac{1}{2}]$ through the variable $\lambda(n,p)$ given as $$\lambda = \frac{n}{2p}, n = 0, 1, \ldots p, \quad (45)$$

which, for each p, delivers partitions of $[0,2/1]$ given by $$\left[\frac{n}{2p}, \frac{n+1}{2p}\right], \begin{array}{l} n = 0, 1, \ldots, p-1 \\ p = 1, 2, \ldots, P. \end{array} \quad (46)$$

The centers of these intervals in the partitions are $$\lambda_m = \frac{1}{2}\left(\frac{n}{2p} + \frac{n+1}{2p}\right) = \frac{2n+1}{4p}, \begin{array}{l} n = 0, 1, \ldots, p-1 \\ p = 1, 2, \ldots, P. \end{array} \quad (47)$$

Stacked offset VSP traces will be placed at the centers of the bins which have offset coordinates $$x_R(n, p) = \lambda_m(n, p)x_S = \lambda_m(n, p) \cdot p\Delta x_S = \quad (48)$$

$$\frac{(2n+1)}{4} \cdot \Delta x_S; \begin{array}{l} n = 0, 1, \ldots, p-1 \\ p = 1, 2, \ldots, P. \end{array}$$

Equation (40) can now be invoked to define $$F(\lambda) = F[\lambda(n, p)] = \frac{1 - \frac{n}{2p}}{1 - \frac{n}{p}}. \quad (49)$$

We have offset VSP data traces $D[p\Delta x_S, z_{Rk}, t_\infty]$ which have been VSP moveout corrected. Also, we have obtained the first break times $T_B(z_{Rk})$, $k=1, 2, \ldots, K$ at multiple receiver depths in the well; we compute the times $$t_\infty(p, n, k) = t_B(z_{Rk}) \cdot \frac{\left(1 - \frac{n}{2p}\right)}{\left(1 - \frac{n}{p}\right)}, \begin{array}{l} k = 1, 2, \ldots, K \\ n = 0, 1, \ldots, p \\ p = 1, 2, \ldots, P. \end{array} \quad (50)$$

In order to bin and stack the offset VSP traces, we proceed as follows:
For the stacked trace to be placed at offset $$x_R(n) = \frac{(2n + 1)}{4} \Delta x_S, \quad n = 0, 1, \ldots, P - 1,$$

mute all offset VSP traces, $k = 1, 2, \ldots, K$ and $p = 1, 2, \ldots, P$, except for the time intervals $$t_\infty(p, n, k) < t_\infty < t_\infty(p, n + 1, k), \quad \begin{array}{l} n = 0, 1, \ldots, p - 1 \\ p = 1, 2, \ldots, P. \end{array} \quad (51)$$

These are the "live" portions of the traces which are subsequently summed over all receiver depths $z_{Rk}$ and shot offsets $p\Delta x_S$. This summed trace constitutes the common reflection point stacked trace at $x(n)$.

The two comments following equation (44) apply here and the following prescription in the implementation is suggested:

It will probably be most convenient to fix the bin index $n$, $n = 0, 1, \ldots, P-1$ when working with offset VSP data. The inequality (51) with fixed n, represent all the "live" segments of traces contributing to the stacked trace at $x(n)$.

In the inequality (51), the geophone depth location $z_{Rk}$ will be $k = 1, 2, \ldots, K$ and the shot offset range will be $p = n+1, n+2, \ldots, P$. When these portions of the offset VSP traces are sorted out, it is a straightforward matter to determine fold in various time windows.

Thus, a method for segregating and stacking offset vertical seismic profile data has been demonstrated. Curves of constant reflector two-way traveltime are constructed depending on receiver depth and source offset. The distance between the borehole and shot point is divided into a predetermined number of segments called bins. Depths at which acoustic pulse receivers are to be located are selected. The area determined by the intersection of the bin segment boundaries and the two-way travel time to the receiver depth crossing curves of the constant two-way travel times to reflectors is sectioned. All reflector two-way travel times corresponding to the said travel time section are identified as suitable for stacking at the center of the preselected bin; the binned data are stacked with a weight depending on fold.

While the present invention has been illustrated by way of preferred embodiment, it is to be understood that it is not limited thereto but only by the scope of the following claims.

APPENDIX I

Travel Time Calculation for an Offset VSP, Dipping Reflector

Reflector: $z = \tan \theta \cdot x + z_O$ ($\theta \sim$ dip)
From the Sketch: $T = D_1/V_O + D_2/V_O = D/V_O$, with $D = D_1 + D_2$
By construction of the reflection path $$D^2 = F^2 + (2H)^2 - 2F \cdot (2H) \cos \lambda \quad \text{(Law of Cosines)}$$

and $$F^2 = (x^2 + z_R^2)$$

$$\beta = \tan^{-1}(z_R/x)$$

$$H = z \cos \theta = \sin \theta x + \cos \theta z_O$$

$$\lambda = \pi/2 - (\beta + \theta), \cos \lambda = \text{sgn}(\beta) \sin(\theta + \beta).$$

Therefore, $$v_0^2 T^2 = x^2 + z_R^2 + 4(\sin \theta \, x + \cos \theta \, z_0)^2 - 4\sqrt{x^2 + z_R^2} (\sin \theta \, x + \cos \theta \, z_0) \, \text{sgn}(\beta) \, (\theta + \beta)$$

T is travel time along the reflection path.
We notice that $$\cos \beta = \frac{x}{\sqrt{x^2 + z_R^2}} \quad \text{and} \quad \sin \beta = \frac{z_R}{\sqrt{x^2 + z_R^2}},$$

therefore, $$\text{sgn}(\beta) \, \text{sgn}(\theta + \beta) = \frac{x \sin \theta}{\sqrt{x^2 + z_R^2}} + \frac{z_R \cos \theta}{\sqrt{x^2 + z_R^2}}$$

and $$v_0^2 T^2 = x^2 + z_R^2 + 4(\sin \theta x + \cos \theta z_O)^2 - 4(\sin \theta x + \cos \theta z_O)(x \sin \theta + z_R \cos \theta).$$

TABLE 1

COMPARISON OF RAY TRACE AND VSP MOVEOUT TIMES FOR REFLECTOR $R_5$

| | x = 500' | | x = 1000' | | x = 1500' | | x = 2000' | |
|---|---|---|---|---|---|---|---|---|
| $z_R$ | T(formula) | T(Sierra) | T(formula) | T(Sierra) | T(formula) | T(Sierra) | T(formula) | T(Sierra) |
| 300' | .872 | .872 | .877 | .878 | .887 | .887 | .899 | .900 |
| 600' | .826 | .826 | .831 | .832 | .841 | .841 | .853 | .855 |
| 900' | .793 | .793 | .799 | .799 | .808 | .809 | .822 | .823 |
| 1200' | .756 | .756 | .762 | .762 | .772 | .773 | .786 | .787 |
| 1500' | .718 | .718 | .724 | .724 | .734 | .735 | .749 | .750 |
| 1800' | .679 | .679 | .686 | .686 | .697 | .697 | .712 | .713 |
| 2100' | .643 | .643 | .650 | .650 | .661 | .662 | .677 | .678 |
| 2400' | .612 | .612 | .619 | .619 | .631 | .632 | .648 | .649 |
| 2700' | .581 | .581 | .589 | .589 | .602 | .602 | .619 | .620 |
| 3000' | .551 | .551 | .560 | .560 | .573 | .574 | .592 | .593 |
| 3300' | .521 | .521 | .530 | .531 | .545 | .545 | .566 | .566 |
| 3600' | .491 | .492 | .501 | .501 | .518 | .518 | .539 | .539 |
| | x = 2500' | | x = 3000' | | x = 3500' | | x = 4000' | |
| $z_R$ | T(formula) | T(Sierra) | T(formula) | T(Sierra) | T(formula) | T(Sierra) | T(formula) | T(Sierra) |
| 300' | .915 | .916 | .935 | .936 | .957 | .958 | .982 | .983 |

TABLE 1-continued
COMPARISON OF RAY TRACE AND VSP MOVEOUT TIMES FOR REFLECTOR $R_5$

| | | | | | | | | |
|---|---|---|---|---|---|---|---|---|
| 600' | .870 | .871 | .889 | .891 | .911 | .914 | .936 | .940 |
| 900' | .839 | .840 | .859 | .861 | .883 | .884 | .909 | .911 |
| 1200' | .804 | .805 | .825 | .826 | .850 | .851 | .877 | .878 |
| 1500' | .767 | .768 | .789 | .791 | .814 | .816 | .842 | .844 |
| 1800' | .731 | .732 | .753 | .755 | .779 | .781 | .808 | .810 |
| 2100' | .697 | .698 | .720 | .722 | .747 | .749 | .776 | .779 |
| 2400' | .669 | .670 | .693 | .695 | .721 | .723 | .752 | .754 |
| 2700' | .642 | .642 | .668 | .668 | .697 | .698 | .730 | .730 |
| 3000' | .616 | .616 | .644 | .644 | .675 | .675 | .709 | .708 |
| 3300' | .591 | .591 | .620 | .620 | .653 | .652 | .689 | .687 |
| 3600' | .566 | .566 | .597 | .597 | .632 | .631 | .670 | .668 |

TABLE 2
COMPARISON OF RAY TRACE AND VSP MOVEOUT TIMES FOR REFLECTOR $R_3$

| | x = 500' | | x = 1000' | | x = 1500' | | x = 2000' | |
|---|---|---|---|---|---|---|---|---|
| $z_R$ | T(formula) | T(Sierra) | T(formula) | T(Sierra) | T(formula) | T(Sierra) | T(formula) | T(Sierra) |
| 150' | .511 | .511 | .523 | .523 | .543 | .543 | .570 | .570 |
| 300' | .488 | .488 | .501 | .501 | .521 | .522 | .549 | .549 |
| 450' | .465 | .465 | .478 | .478 | .499 | .500 | .527 | .528 |
| 600' | .442 | .442 | .456 | .456 | .477 | .478 | .506 | .507 |
| 750' | .426 | .426 | .440 | .440 | .463 | .463 | .493 | .493 |
| 900' | .409 | .409 | .425 | .425 | .449 | .449 | .480 | .480 |
| 1050' | .392 | .392 | .408 | .408 | .433 | .433 | .467 | .466 |
| 1200' | .373 | .373 | .390 | .390 | .416 | .416 | .451 | .451 |
| 1350' | .354 | .354 | .372 | .372 | .400 | .400 | .436 | .435 |
| 1500' | .336 | .336 | .354 | .354 | .383 | .383 | .420 | .420 |
| 1650' | .317 | .317 | .336 | .336 | .367 | .367 | .406 | .405 |
| 1800' | .298 | .298 | .319 | .319 | .351 | .351 | .392 | .391 |

| | x = 2500' | | x = 3000' | | x = 3500' | |
|---|---|---|---|---|---|---|
| $z_R$ | T(formula) | T(Sierra) | T(formula) | T(Sierra) | T(formula) | T(Sierra) |
| 150' | .603 | .603 | .640 | .640 | .682 | .681 |
| 300' | .582 | .582 | .620 | .620 | .663 | .662 |
| 450' | .561 | .562 | .600 | .601 | .642 | .643 |
| 600' | .540 | .542 | .580 | .581 | .623 | .625 |
| 750' | .529 | .530 | .570 | .570 | .615 | .615 |
| 900' | .518 | .518 | .561 | .560 | .608 | .606 |
| 1050' | .506 | .505 | .550 | .549 | .598 | .596 |
| 1200' | .492 | .491 | .537 | .536 | .586 | .584 |
| 1350' | .478 | .477 | .525 | .523 | .575 | .572 |
| 1500' | .464 | .463 | .512 | .510 | .564 | .560 |
| 1650' | .451 | .449 | .501 | .498 | .554 | .549 |
| 1800' | .438 | .436 | .489 | .486 | .544 | .537 |

TABLE 3
FIRST BREAK TIMES, RMS VELOCITIES AND TWO-WAY, NORMAL INCIDENCE REFLECTION TIMES FOR OFFSET VSP MODEL DATA

| $z_R$ | $T_B(z_R)$ | $v_{RMS}(T_B)$ | $z_R$ | $T_B(z_R)$ | $v_{RMS}(T_B)$ | $z_R$ | $T_B(z_R)$ | $v_{RMS}(T_B)$ | $z_R$ | $T_B(z_R)$ | $v_{RMS}(T_B)$ |
|---|---|---|---|---|---|---|---|---|---|---|---|
| 50' | .00769 | 6500 | 1150' | .15598 | 7455.4 | 2250' | .29127 | 7789.9 | 3350' | .40312 | 8408.3 |
| 100' | .01539 | 6500 | 1200' | .16239 | 7469.3 | 2300' | .29654 | 7823.5 | 3400' | .40812 | 8429.6 |
| 150' | .02308 | 6500 | 1250' | .16880 | 7482.1 | 2350' | .30180 | 7855.8 | 3450' | .41312 | 8450.4 |
| 200' | .03077 | 6500 | 1300' | .17521 | 7494.0 | 2400' | .30706 | 7886.8 | 3500' | .41812 | 8470.6 |
| 250' | .03846 | 6500 | 1350' | .18162 | 7505.0 | 2450' | .31233 | 7916.8 | 3550' | .42312 | 8490.3 |
| 300' | .04615 | 6500 | 1400' | .18803 | 7515.3 | 2500' | .31759 | 7945.6 | 3600' | .42812 | 8509.4 |
| 350' | .05385 | 6500 | 1450' | .19444 | 7524.8 | 2550' | .32285 | 7973.3 | 3650' | .43312 | 8528.1 |
| 400' | .06154 | 6500 | 1500' | .20086 | 7533.7 | 2600' | .32812 | 8000.1 | 3700' | .43812 | 8546.4 |
| 450' | .06923 | 6500 | 1550' | .20727 | 7542.1 | 2650' | .33312 | 8033.8 | 3750' | .44312 | 8564.1 |
| 500' | .07692 | 6500 | 1600' | .21368 | 7549.9 | 2700' | .33812 | 8066.4 | 3800' | .44812 | 8581.5 |
| 550' | .08462 | 6500 | 1650' | .22009 | 7557.4 | 2750' | .34312 | 8097.9 | 3850' | .45312 | 8598.4 |
| 600' | .09231 | 6500 | 1700' | .22650 | 7564.4 | 2800' | .34812 | 8128.3 | 3900' | .45812 | 8614.9 |
| 650' | .09786 | 6667.1 | 1750' | .23291 | 7570.9 | 2850' | .35312 | 8157.8 | | | |
| 700' | .10342 | 6812.7 | 1800' | .23932 | 7577.2 | 2900' | .35812 | 8186.4 | | | |
| 750' | .10897 | 6940.9 | 1850' | .24573 | 7583.1 | 2950' | .36312 | 8214.1 | | | |
| 800' | .11453 | 7054.7 | 1900' | .25214 | 7588.7 | 3000' | .36812 | 8241.0 | | | |
| 850' | .12009 | 7156.3 | 1950' | .25855 | 7594.0 | 3050' | .37312 | 8267.0 | | | |
| 900' | .12564 | 7247.8 | 2000' | .26496 | 7599.0 | 3100' | .37812 | 8292.3 | | | |
| 950' | .13120 | 7330.5 | 2050' | .27022 | 7640.6 | 3150' | .38312 | 8316.8 | | | |
| 1000' | .13675 | 7405.6 | 2100' | .27548 | 7680.3 | 3200' | .38812 | 8340.7 | | | |
| 1050' | .14316 | 7423.8 | 2150' | .28075 | 7718.4 | 3250' | .39312 | 8363.9 | | | |

TABLE 3-continued
FIRST BREAK TIMES, RMS VELOCITIES AND TWO-WAY, NORMAL INCIDENCE REFLECTION TIMES FOR OFFSET VSP MODEL DATA

| $z_R$ | $T_B(z_R)$ | $v_{RMS}(T_B)$ | $z_R$ | $T_B(z_R)$ | $v_{RMS}(T_B)$ | $z_R$ | $T_B(z_R)$ | $v_{RMS}(T_B)$ | $z_R$ | $T_B(z_R)$ | $v_{RMS}(T_B)$ |
|---|---|---|---|---|---|---|---|---|---|---|---|
| 1100' | .14957 | 7440.3 | 2200' | .28601 | 7754.9 | 3300' | .39812 | 8386.4 | | | |

$R_1$: $t_\infty(600') = .18462$, $v_{RMS}(t_\infty) = 6500$
$R_2$: $t_\infty(1000') = .23750$, $v_{RMS}(t_\infty) = 7405.6$
$R_3$: $t_\infty(2000') = .52991$, $v_{RMS}(t_\infty) = 7599.0$
$R_4$: $t_\infty(2600') = .65623$, $v_{RMS}(t_\infty) = 8000.1$
$R_5$: $t_\infty(3900') = .91623$, $v_{RMS}(t_\infty) = 8614.9$

I claim:

1. A method for moveout correcting and estimating stacking velocities for offset VSP data comprising the steps of:

receiving vertical seismic profile data from an acoustic pulse receiver located in a borehole beneath the earth's surface and horizontally offset from any acoustic pulse generator on the surface causing reflected acoustic pulses to be received by said acoustic pulse receiver or receiving vertical seismic profile data from acoustic pulse receivers located on the earth's surface horizontally offset from a borehole containing an acoustic pulse generator causing reflected acoustic pulses to be received by said acoustic pulse receivers located on the earth's surface;

applying a dynamic moveout correction based on the two-way primary reflection time, the root mean square acoustic velocity in the formation, and the first arrival time of direct path acoustic pulses to the vertical seismic profile data to align reflection events;

estimating stacking velocities of reflected acoustic pulses;

displaying said moveout corrected vertical seismic profile data.

2. The method according to claim 1 wherein said applying step includes the step of obtaining moveout correction satisfying the equation $$T_{(x,z_R)} = t_\infty \sqrt{1 + \frac{x^2}{(t_\infty - T_B)^2 \, v_{RMS}^2(t_\infty)}}$$

$$T_B \sqrt{1 + \frac{x^2}{(t_\infty - T_B)^2 \, v_{RMS}^2(T_B)}}$$

where
$t_\infty$ = two-way normal incidence travel time to a reflector
$T_B$ = normal incidence first break time
$V_{RMS}(t_\infty)$ = root mean square of velocity in the media
$V_{RMS}(T_B)$ = root mean square of velocity in the media (direct normal incidence path from source to receiver).

3. The method according to claim 1 wherein said applying step includes the step of obtaining moveout correction satisfying the alternative equation $$T_{(x,z_R)} = T_0 \sqrt{1 + \frac{x^2}{(t_\infty - T_B)^2 V_{RMS}^2(T_0)}} +$$

$$(T_0 - T_B) \sqrt{1 + \frac{(T_0 - T_B)x^2}{(t_\infty - T_B)^2 [T_0 V_{RMS}^2(T_0) - T_B V_{RMS}^2(T_B)]}}$$

where
$t_\infty = 2T_O$
$T_O$ = one-way normal incidence travel time to a reflector
$T_B$ = normal incidence first break time
$V_{RMS}(T_O) = V_{RMS}(t_\infty)$
$V_{RMS}(T_B)$ = root mean square of velocity in the media (direct normal incidence path from source to receiver).

* * * * *

UNITED STATES PATENT AND TRADEMARK OFFICE
CERTIFICATE OF CORRECTION

PATENT NO. : 4,802,146

DATED : January 31, 1989

INVENTOR(S) : George P. Moeckel

It is certified that error appears in the above-identified patent and that said Letters Patent is hereby corrected as shown below:

Column 4, line 11, "corection" should read --correction--.

Column 5, line 32, "$_0 z_R$" should read --$\int_0 z_R$--.

Column 7, line 13, "$(0,x_R)$" should read --$(0,z_R)$--.

Column 7, line 62, "$\dfrac{x^2}{(t_\infty-T_B)^2 v^2 RMS(t_B)}$" should read --$\dfrac{x^2}{(t_\infty-T_B)^2 v^2 RMS(t_\infty)}$--.

Column 8, line 6, "symmetry" should read --asymmetry--.

Column 10, line 18, "$t_{28}$" should read --$t_\infty$--.

Column 12, line 44, "$0<t_B t_\infty(j)$" should read --$0<t_B<t_\infty(j)$--.

Column 12, line 50, "$t_\infty<t_B(z_{Rk})$" should read --$t_\infty>t_B(z_{R_k})$--.

Column 16, lines 58-59, change italized words to regular block form.

Column 18, line 30, insert --sin-- before $(0 + \beta)$.

Signed and Sealed this

Ninth Day of October, 1990

*Attest:*

HARRY F. MANBECK, JR.

*Attesting Officer*   *Commissioner of Patents and Trademarks*